(12) United States Patent
Titze

(10) Patent No.: US 12,233,576 B2
(45) Date of Patent: Feb. 25, 2025

(54) METHOD AND APPARATUS FOR IMPREGNATING A FIBRE BUNDLE AND METHOD AND FACILITY FOR PRODUCING A THREE-DIMENSIONAL STRUCTURE

(71) Applicant: DEUTSCHES ZENTRUM FÜR LUFT- UND RAUMFAHRT E.V., Cologne (DE)

(72) Inventor: Maik Titze, Hannover (DE)

(73) Assignee: DEUTSCHES ZENTRUM FÜR LUFT- UND RAUMFAHRT E.V., Cologne (DE)

( * ) Notice: Subject to any disclaimer, the term of this patent is extended or adjusted under 35 U.S.C. 154(b) by 433 days.

(21) Appl. No.: 17/438,111

(22) PCT Filed: Feb. 13, 2020

(86) PCT No.: PCT/EP2020/053806
§ 371 (c)(1),
(2) Date: Sep. 10, 2021

(87) PCT Pub. No.: WO2020/182407
PCT Pub. Date: Sep. 17, 2020

(65) Prior Publication Data
US 2022/0212369 A1    Jul. 7, 2022

(30) Foreign Application Priority Data

Mar. 13, 2019  (DE) ..................... 10 2019 106 355.8

(51) Int. Cl.
*B29B 15/12*    (2006.01)
*B29C 64/118*   (2017.01)
(Continued)

(52) U.S. Cl.
CPC .......... *B29B 15/122* (2013.01); *B29C 64/118* (2017.08); *B29C 64/209* (2017.08);
(Continued)

(58) Field of Classification Search
None
See application file for complete search history.

(56) References Cited

U.S. PATENT DOCUMENTS

| 5,114,633 A | 5/1992 | Stewart |
| 2014/0367021 A1 | 12/2014 | Schleiermacher |

(Continued)

FOREIGN PATENT DOCUMENTS

| DE | 2926223 A1 | 1/1981 |
| JP | H05235117 A | 9/1993 |

(Continued)

*Primary Examiner* — Jacob T Minskey
*Assistant Examiner* — Adrianna N Konves
(74) *Attorney, Agent, or Firm* — WCF IP

(57) ABSTRACT

The invention relates to a method for impregnating at least one fibre bundle (11) with a high-viscosity plastics material (13), said method comprising the following steps: •—providing at least one fibre bundle (11) for impregnation, formed of a multiplicity of continuous fibres, and providing a plastics material (13), melted at a mandated operating temperature and of high viscosity, and •—impregnating the fibre bundle (11) with the plastics material (13), by guiding the fibre bundle for impregnation continuously through an impregnation cavity (12), filled with the melted plastics material (13), •—where during impregnation of the fibre bundle, the melted plastics material within the impregnation cavity is contacted with a surface (15) of at least one oscillation generator (14) in such a way that sonic energy is introduced by said oscillation generator into the melted high-viscosity plastics material in the impregnation cavity.

9 Claims, 6 Drawing Sheets

(51) Int. Cl.
  *B29C 64/209* (2017.01)
  *B29C 64/321* (2017.01)
  *B29C 70/38* (2006.01)
  *B29K 501/12* (2006.01)
  *B33Y 10/00* (2015.01)
  *B33Y 30/00* (2015.01)
  *B33Y 40/10* (2020.01)
  *B33Y 70/10* (2020.01)

(52) U.S. Cl.
  CPC .......... *B29C 64/321* (2017.08); *B29C 70/382* (2013.01); *B29K 2501/12* (2013.01); *B33Y 10/00* (2014.12); *B33Y 30/00* (2014.12); *B33Y 40/10* (2020.01); *B33Y 70/10* (2020.01)

(56) References Cited

U.S. PATENT DOCUMENTS

2017/0326802 A1  11/2017  Mark et al.
2019/0143565 A1  5/2019  Mohanty et al.

FOREIGN PATENT DOCUMENTS

| JP | 2003039430 A | 2/2003 |
| JP | 2004253863 A | 9/2004 |
| WO | 2017/068159 A1 | 4/2017 |
| WO | 2018/084908 A1 | 5/2018 |

METHOD AND APPARATUS FOR IMPREGNATING A FIBRE BUNDLE AND METHOD AND FACILITY FOR PRODUCING A THREE-DIMENSIONAL STRUCTURE

The invention relates to a method for impregnating at least one fiber bundle with a highly viscous plastics material. The invention also relates to a device for this purpose. The invention moreover relates to a method for producing a three-dimensional structure which is formed from two or more different materials. The invention also relates to an installation for producing such a three-dimensional structure.

On account of the particular weight-specific strength and rigidity, fiber composite materials have become indispensable as modern materials. However, the combination of fiber material and plastics material in 3D printing also opens up new possibilities for the production of complex structures without having to resort to isotropic materials in this respect. Both in the production of fiber composite components from fiber composite materials and in 3D printing with fiber reinforcement, use is very frequently made of fiber rovings, which constitute a type of fiber bundle and are formed from a multiplicity of endless fibers, also referred to as filaments.

Thus, DE 10 2017 124 352.6 discloses an installation for producing 3-dimensional structures which comprise 2 or more different materials and in the process both a virtually endless fiber material, for example in the form of rovings, and a thermoplastic material are fed to a 3D printhead, which then open out into a mixing chamber in order to impregnate the fiber material with the thermoplastic material there. The material mixture thus formed is then extruded via an outlet of the 3D printhead in order to produce the three-dimensional structure.

The impregnation of virtually endless fiber rovings with thermoplastic material is currently unsatisfactory, however, owing to the high viscosity of the thermoplastic material and the low permeability of the endless fibers, in particular whenever the fiber material is to be continuously conveyed and extruded.

It is known and widespread in practice to first spread open the fiber rovings, that is to say to fan them out widthwise. For this purpose, the fiber roving is generally guided over several specially shaped rollers that are shaped such that the cross section of the fiber bundle is enlarged and thus the distance between the individual filaments is increased. In this way, the required penetration depth of the molten plastics material is reduced and the permeability of the fibers is increased. The molten plastics material is then brought into contact with the spread-open fiber at one or more locations under the action of pressure over a relatively long period of time in order to impregnate it.

For example, EP 0 712 716 A1 discloses a method for impregnating endless fibers or fiber bundles with a molten thermoplastic material, the fibers or rovings passing through an impregnation zone which has the shape of a damped wave.

US 2012/0040106 A1 discloses a method and a device for impregnating a fiber material with a matrix material, in the case of which method the fiber material is introduced into a molding tool and then infused with the matrix material. While the fiber material is being infused with the matrix material, loudspeakers or tone generators are used to create vibrations in order to improve the result of the impregnation.

DE 10 2016 107 956 A1 discloses a method for impregnating endless fibers for the purpose of producing fiber-reinforced semi-finished products, in which firstly a plurality of individual fibers are brought together to form a common fiber bundle and impregnated with the plastics material. The fiber material impregnated with the plastics material is then extruded onto a cooled roller, where it is operatively connected to a sonotrode such that the sonotrode induces an ultrasonic vibration in the fiber material having the matrix material.

The methods known from the prior art for impregnating fiber material, in particular fiber bundles, with a highly viscous plastics material, such as for example a thermoplastic material, have different disadvantages. Thus, in the case of the methods with fiber spreading a relatively large amount of structural space is required, since the fibers have to be deflected multiple times. In order that the fibers are not damaged, the maximum permitted bending radii must be taken into consideration here. The multiple deflection likewise causes an increase in friction and thus a greater degree of tensile force required on the fiber. This must be ensured by the process, so that continuous fiber guidance is possible. The tensile force applied should not exceed a maximum permissible value here, in order to prevent tearing of individual filaments of the fiber roving. Processes that operate with no fiber spreading or only a very small extent of fiber spreading reduce the risk of damage to the fibers, but require long process times in order to achieve sufficient fiber impregnation.

Fiber impregnation on the basis of sound energy or vibration energy has only been known to date for low-viscosity media. In the case of highly viscous media, such as for example molten thermoplastic material, particular challenges arise in terms of coupling the sound or vibration energy into the medium. For applications in which only a small amount of structural space is available and fibers have to be impregnated with highly viscous materials, there is therefore no suitable method available that enables deep impregnation of the fiber rovings in a manner reliable in process terms.

Against this background, it is an object of the present invention to specify an improved method and an improved device with which in particular fiber rovings can be impregnated with a highly viscous plastics material in a manner reliable in process terms without having to make a large amount of structural space available or expect long process times for this. It is likewise an object of the present invention to specify an improved method and an improved installation for producing three-dimensional structures with which fiber rovings can be continuously impregnated with a highly viscous plastics material in order to enable impregnation during printing, in particular in the case of generative methods.

What is proposed according to patent claim 1 is a method for impregnating at least one fiber bundle with a highly viscous plastics material, wherein for this firstly at least one fiber bundle to be impregnated, which is formed from a plurality of endless fibers (what are known as filaments), and a plastics material which is molten and highly viscous at a predefined process temperature are provided. A highly viscous plastics material is understood to mean here in particular a plastics material which, at a predefined process temperature, has a viscosity of essentially more than 8000 mPas (millipascal seconds). Here, a distinction must be made from low-viscosity plastics materials that have a viscosity of up to 300 mPas. Between 300 mPas and 8000 mPas, reference is made to an average viscosity. Thermoplastic materials, as are frequently found in hybrid 3D printing, often have a viscosity of 300 Pas to 10 000 Pas. Depending on the extent to which the plastics material is sheared when it comes into contact with the fiber, the viscosity can also be significantly below the usual zero-shear viscosity (3000-10 000 Pas). The predefined process temperature is understood to mean that temperature of the plastics material at which the plastics material is used for impregnation. In the case of thermoplastic materials, this is in particular the temperature at which the plastics material is molten and can thus impregnate the fiber bundle accordingly.

The fiber bundle provided is then impregnated with the plastics material by continuously guiding the fiber bundle to be impregnated, for example a roving, through an impregnation cavity. In the process, the temperature-controlled, molten and highly viscous plastics material is located in the impregnation cavity, with the result that the fiber bundle is completely enclosed by the molten plastics material located in the impregnation cavity as the fiber bundle is guided through the impregnation cavity. Here, the impregnation cavity may be filled with the plastics material such that there is no air in the impregnation cavity during the impregnation process. In this respect, it may of course be provided that new plastics material is also continuously provided to the impregnation cavity during the continuous passage of the fiber bundle, in order to be able to ensure a continuous impregnating operation. Furthermore, it may of course also be provided that the impregnation cavity has a temperature control device, in order to heat the impregnation cavity to the predefined process temperature of the highly viscous plastics material. Accordingly, it is advantageous if, during the continuous passage of the fiber bundle through the impregnation cavity, new plastics material is continuously added to the impregnation cavity and/or the temperature of the plastics material located in the impregnation cavity is continuously controlled, in order to keep said plastics material in particular at the desired process temperature.

According to the invention, it is now provided that, during the impregnation of the fiber bundle, the molten and highly viscous plastics material located in the impregnation cavity is in contact with a surface of at least one vibration generator in such a way that sound energy is introduced into the molten and highly viscous plastics material of the impregnation cavity by means of the vibration generator.

For this purpose, the at least one vibration generator has a surface that is in direct contact with the molten and highly viscous plastics material of the impregnation cavity, wherein the vibration generator is designed to generate a vibration which is then transferred in the form of sound energy to the plastics material via the surface that is in contact with the plastics material. The vibrations of the vibration generator thus generate sound waves or pressure waves within the molten and highly viscous plastics material, which then lead to the highly viscous plastics material penetrating deeply into the fiber bundle and wetting the individual filaments or endless fibers in the process. In particular the intermediate spaces between the individual filaments or endless fibers of the fiber bundle are occupied by the highly viscous plastics material here, and therefore a very high impregnation quality can be achieved even if the fiber bundle is continuously guided through the impregnation cavity.

In this respect, the inventor has recognized that a vibration generator, the surface of which is in direct contact with the highly viscous and molten plastics material, can be used to introduce sound energy into the highly viscous plastics material such that a fiber bundle or roving of high quality can be impregnated in a continuous process as a result. The structural space required for this is very small, and therefore the method according to the invention is suitable in particular for 3D printing and the continuous depositing of endless fibers. By making the structural space smaller, in particular in the case of end effectors the mass of the end effector that is to be moved is reduced, which makes it possible to increase the precision of the process as a whole.

The inventor has furthermore also recognized that, despite the high viscosity of the molten plastics material, a vibration generator in contact with the plastics material can be used nevertheless to introduce sound energy into the plastics material such that the fiber bundle is impregnated with the plastics material with a high quality. Therefore, this is surprising since the molten and highly viscous plastics material needs much more time to regain its shape after mechanical deformation than low-viscosity media by virtue of the viscoelastic effect. However, a high impregnation performance can be achieved.

According to one advantageous embodiment, the highly viscous plastics material is a thermoplastic material which is highly viscous, i.e. has a viscosity of more than 8000 mPas, at the predefined process temperature at which the plastics material is molten and is present in the form of a melt.

According to a further advantageous embodiment, the vibration generator generates a vibration amplitude of between 1 μm and 150 μm, preferably a maximum of 40 μm, particularly preferably a maximum of 35 μm, and/or a vibration frequency of between 100 Hz and 100 kHz, preferably between 15 kHz and 60 kHz, particularly preferably between 19 kHz and 60 kHz. This makes it possible to introduce sound energy into the highly viscous plastics material, which sound energy ensures a very high impregnation performance despite the technical challenge of the highly viscous medium. In one particular embodiment, the vibration frequency is not higher than 45 kHz. In one particular embodiment, the vibration frequency is between 19.2 kHz and 19.7 kHz.

According to a further advantageous embodiment, the vibration generator induces real and/or complex eigenmodes of a structure of the impregnation cavity. It has been found that a sufficient sound power or sound energy can however be introduced into the plastics material in this way in order to achieve a high impregnation performance, despite the viscoelastic effect of the highly viscous plastics material. In this embodiment, at least part of the surface of the vibration generator is formed by a special, preferably modally vibrating structure, wherein the vibration generator can induce real and/or complex eigenmodes of this structure of the impregnation cavity. Such a structure or structures is/are preferably completely covered by the plastics material in the impregnation cavity. Such structures may be for example modally vibrating plates in the impregnation cavity. However, it is also conceivable that such structures may be a tube with eigenmodes, through which tube the fiber bundle to be impregnated is guided. This makes it possible to significantly improve the impregnation performance, even in the case of highly viscous plastics material. In this respect, the tube itself may form the impregnation cavity or be part of it.

In that case, the vibration maxima and minima of the structure that arise act as spatially distributed generators for coupling in the sound energy.

According to a further advantageous embodiment, it is provided that the surface of the vibration generator which is in contact with the molten plastics material is subjected to a microstructuring, roughening and/or plasma pretreatment or is provided such that the adhesion or the wetting of the surface of the vibration generator with the molten plastics material is improved. It has been found that such measures for pretreating the surface of the vibration generator which is in contact with the plastics material make it possible to improve the adhesion of the surface or the wettability of the surface with the molten plastics material in such a way that corresponding sound waves or pressure waves can be introduced into the molten plastics material despite the viscoelastic effect of the highly viscous plastics material, in order to achieve the necessary sound energy for the impregnation of the fiber bundle. As a result of increasing the adhesiveness of the surface of the vibration generator that is in contact with the plastic, even at high frequency and/or high amplitude of the vibration generator, the creation of cavities, which prevent the transfer of the required sound power, between the surface of the vibration generator and the molten plastics material is prevented.

According to a further advantageous embodiment, the plastics material is physically modified in order to reduce the forces of cohesion, as a result of which the wetting of the surface of the vibration generator can be improved and the forces of cohesion are reduced.

According to a further embodiment, it is provided that the fiber bundle in the impregnation cavity is guided through the surface of the vibration generator that at least partially encloses the fiber bundle while the surface of the vibration generator is in contact with the molten and highly viscous plastics material. Here, the fiber bundle is guided through a cavity of the vibration generator in the manner of the eye of a needle or an arc, wherein in this region the vibration generator discharges the sound energy into the highly viscous plastics material. In this respect, the fiber bundle can be in contact with the surface of the vibration generator at certain points. The specific geometry here prevents the material from flowing away or ensures that the vibration energy or sound energy is coupled in through zones of excess pressure or negative pressure in an improved manner.

In the method according to the invention for impregnating the fiber bundle, it can be provided, among other things, for the fiber bundle to be spread open by suitable measures upstream of the impregnation cavity or in the impregnation cavity in order to improve the result, as is allowed e.g. by the structural space available. In principle, however, it is not necessary to bring about a spreading open of the fibers of the fiber bundle when the method according to the invention is being used.

According to one embodiment, it is provided that the molten plastics material is guided or flows through the impregnation cavity together with the fiber bundle. For this purpose, the impregnation cavity may have an inlet for the fiber bundle and an inlet for the molten plastics material, wherein in one preferred embodiment the fiber bundle and the molten plastics material are guided into the impregnation cavity through one and the same inlet. Accordingly, the impregnation cavity may have an outlet for the fiber bundle and an outlet for the molten plastics material, wherein in one preferred embodiment the fiber bundle and the molten plastics material are guided out of the impregnation cavity through one and the same outlet.

This makes it possible for example to produce a plastics-fiber semifinished product (for example a thermoplastic-fiber semifinished product) by for example guiding the fiber bundle and the molten plastics material through a nozzle or an extruder in the form of an outlet.

According to one embodiment, it is provided that a pressure is applied to the molten plastics material in the impregnation cavity or it is imprinted during the impregnation of the fiber bundle. In this case, the molten plastics material may be under a pressure that is greater than an ambient pressure. Thus, it is conceivable that the molten plastics material is under a melt pressure of from 5 bar to 100 bar, if appropriate even up to 400 bar.

The pressure of the molten plastics material is an additional pressure which does not oscillate in the kHz range and is determined in particular by the flow channel geometry and the conveying velocity. This is because the introduction of sound into the molten plastics material (melt) also generates a change in pressure which, however, oscillates in the kHz range in accordance with the vibration generator. The pressure that is meant here is independent of the introduction of sound and is introduced in addition to the introduction of sound. An additional pressure that is independent of the introduction of sound or the sound energy introduced is thus applied to the molten plastics material in the impregnation cavity. The molten plastics material is thus pressurized in addition to the introduction of the sound energy.

Here, the molten plastics material may be under a pressure that is greater than the outlet pressure at or downstream of the outlet or nozzle outlet. This makes it possible to position the nozzle with only a very small gap to a pressure bed. In this case there would be a pressure of 100 bar, for example, at the nozzle outlet, since the melt cannot emerge at a free end, but this is lower than the pressure in the impregnation cavity (for example 200 bar).

Imprinting the molten plastics material can be achieved, for example, in conjunction with the previous embodiment, in which the molten plastics material is guided out of the impregnation cavity through a nozzle or an extruder together with the fiber material. This makes it possible to achieve a pressure gradient between the inlet of the molten plastics material and the outlet of the molten plastics material.

It is advantageous here if the melt pressure of the plastics material is lower than the cavitation threshold. It is advantageous here to increase the melt pressure only to the extent that it is also possible to introduce enough sound energy into the molten plastics material to reach the cavitation threshold. It has surprisingly been found that more pronounced cavitation effects form and disperse in an imprinted, molten plastics material in conjunction with the introduction of sound energy into the plastics material by means of the vibration generator, which cavitation effects result in an improved impregnation of the fiber material by the molten plastics material.

The object is moreover also achieved according to the invention by the method for producing a three-dimensional structure which is formed from two or more different materials, wherein a resulting mixed material is discharged by means of a 3D printhead of a 3D printing system. In this respect, the method comprises the following steps:

feeding a highly viscous plastics material as a first material and a virtually endless fiber bundle of a fiber material as a second material to the 3D printing installation, wherein the two materials are continuously fed to an impregnation cavity of the 3D printing installation in order to impregnate the virtually endless fiber bundle with the highly viscous and molten plastics material, extruding the fiber bundle impregnated with the highly viscous plastics material by means of the 3D printhead, wherein, during the production of the three-dimensional structure, the virtually endless fiber bundle is continuously impregnated with the highly viscous and molten plastics material by the method as described above.

In this method, the highly viscous plastics material and the fiber material are fed to the impregnation cavity, in which the two materials are then combined to form a material mixture by impregnating the fiber material in the form of a fiber bundle or roving with the highly viscous plastics material in the impregnation cavity. The fiber bundle impregnated in this way is then extruded from the 3D printhead in order to produce the three-dimensional structure.

Moreover, the object is also achieved by the device for impregnating at least one fiber bundle, wherein the device has an impregnation cavity, into which the highly viscous plastics material has been filled or can be filled, wherein the impregnation cavity has an inlet and an outlet in such a way that a fiber bundle for impregnation can be guided through the highly viscous and molten plastics material of the impregnation cavity. The fiber bundle is thus introduced into the impregnation cavity by means of the inlet and guided out of the impregnation cavity again by means of the outlet, wherein it is impregnated with the plastics material after being guided out of the outlet of the impregnation cavity. The device furthermore has a vibration generator, a surface of which is in contact or can be brought into contact with the highly viscous and molten plastics material located in the impregnation cavity and which vibration generator is designed to introduce sound energy into the highly viscous and molten plastics material.

This device is advantageously designed such that it can carry out the method for impregnating a fiber bundle described above.

In particular, it can be provided here that the surface which is in contact with or can be brought into contact with the molten plastics material has a microstructuring, roughening and/or plasma treatment in order to improve the adhesion between the surface of the vibration generator and the molten plastics material.

It may likewise be provided here that the surface of the vibration generator has a cavity, through which the fiber bundle to be impregnated can be guided when the fiber bundle is being guided through the highly viscous and molten plastics material of the impregnation cavity.

According to a further advantageous embodiment, it can be provided that the cavity of the surface of the vibration generator forms a tube through which the fiber bundle can be guided in order to be impregnated with the highly viscous and molten plastics material, wherein the tube forms a modally vibrating structure and/or a vibrating structure with eigenmodes. It has been found that the use of a modally vibrating structure or a vibrating structure with eigenmodes makes it possible to significantly improve the impregnation result despite the high viscosity of the medium and the viscoelastic effect. Such a tube may, however, also itself form the impregnation cavity, with the result that the roving is guided and the highly viscous plastics material is present inside the tube.

The object is moreover also achieved by the installation for producing a three-dimensional structure, wherein the installation has a printhead, which has a first material feed for feeding a virtually endless fiber bundle and at least one second material feed for feeding a plastics material, wherein the material feeds open out in a common impregnation cavity of the printhead in order to impregnate the fiber bundle with the molten and highly viscous plastics material, in the process both the fiber bundle and a plastics material being continuously fed to the printhead, wherein the plastics material can be fed in the still-solid state of matter. By virtue of a temperature control device in the printhead, it is then possible to bring the fed plastics material to its required process temperature and have it be present in the molten state. It is of course also conceivable that the molten and temperature-controlled plastics material has already been fed to the printhead. The impregnated fiber bundle can then be extruded from the printhead by means of an outlet of the printhead.

According to the invention, the printhead has a device for impregnating the fiber bundle, wherein what is provided for this purpose is a vibration generator, a surface of which is in contact or can be brought into contact with the highly viscous and molten plastics material located in the impregnation cavity and which vibration generator is designed to introduce sound energy into the highly viscous and molten plastics material.

The invention is explained by way of example with reference to the appended figures, in which.

Figure 1:
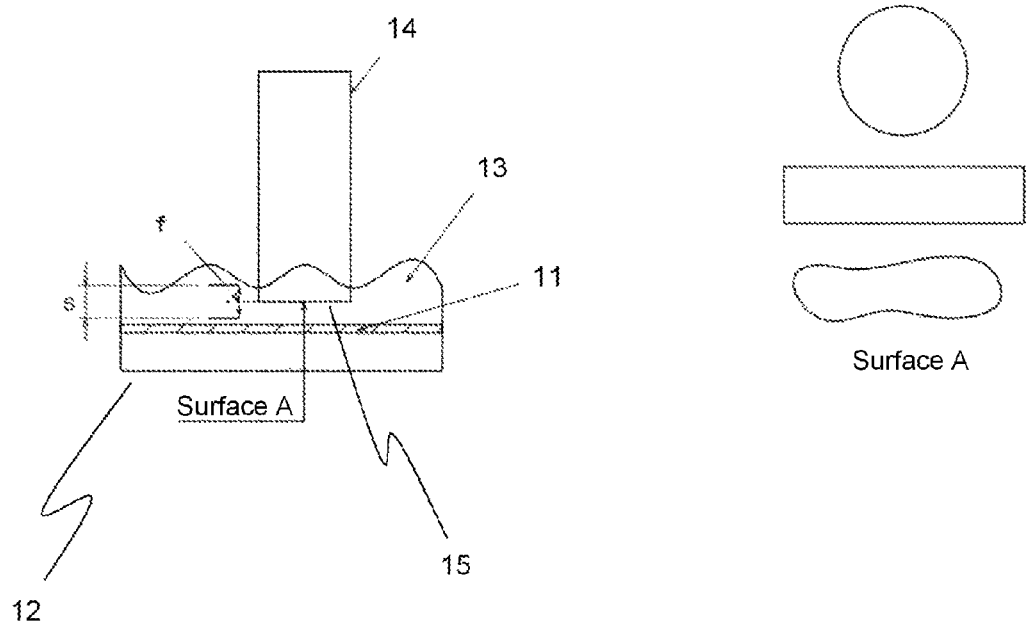
FIG. 1 shows a schematic illustration of the device according to the invention for impregnating.

FIG. 1 shows a greatly simplified schematic representation of a device 10 for impregnating a fiber bundle 11 which is guided through an impregnation cavity 12. Here, the impregnation cavity 12 is filled with a highly viscous and molten plastics material 13 with which the fiber bundle 11 is to be impregnated.

Furthermore, the device 10 has a vibration generator 14, a surface 15 of which is in contact with the molten and highly viscous plastics material 13. The vibration generator 14 shown in FIG. 1 is a longitudinal vibrator, which performs a stroke movement in the form of an amplitude s in order to introduce the sound energy into the highly viscous plastics material 13 at a predefined frequency f. In this respect, in the exemplary embodiment in FIG. 1 the direction of the stroke movement is essentially perpendicular to the fiber bundle 11.

By virtue of the fact that the surface 15 of the vibration generator 14 is in direct contact with the highly viscous and molten plastics material 13, the vibrations generated by the vibration generator 14 can be introduced into the plastics material 13 in the form of sound energy in order to improve the impregnation performance of the fiber bundle 11.

It can be provided here that the surface 15 of the vibration generator 13 is subjected to a microstructuring, roughening and/or plasma pretreatment in order to improve the adhesion between the surface 15 of the vibration generator 14 and the molten and highly viscous plastics material 13. This has the effect that no cavities, which impede or even entirely prevent coupling of the vibrations of the vibration generator 14 into the plastics material 13, form between the surface 15 of the vibration generator 14 and the plastics material 13 during the vibrating.

The right-hand side of FIG. 1 shows various possible cross-sectional shapes of the vibration generator 14 which, as the surface 15, are intended to couple the vibrations generated by the vibration generator 14 into the highly viscous plastics material.

Figure 2:
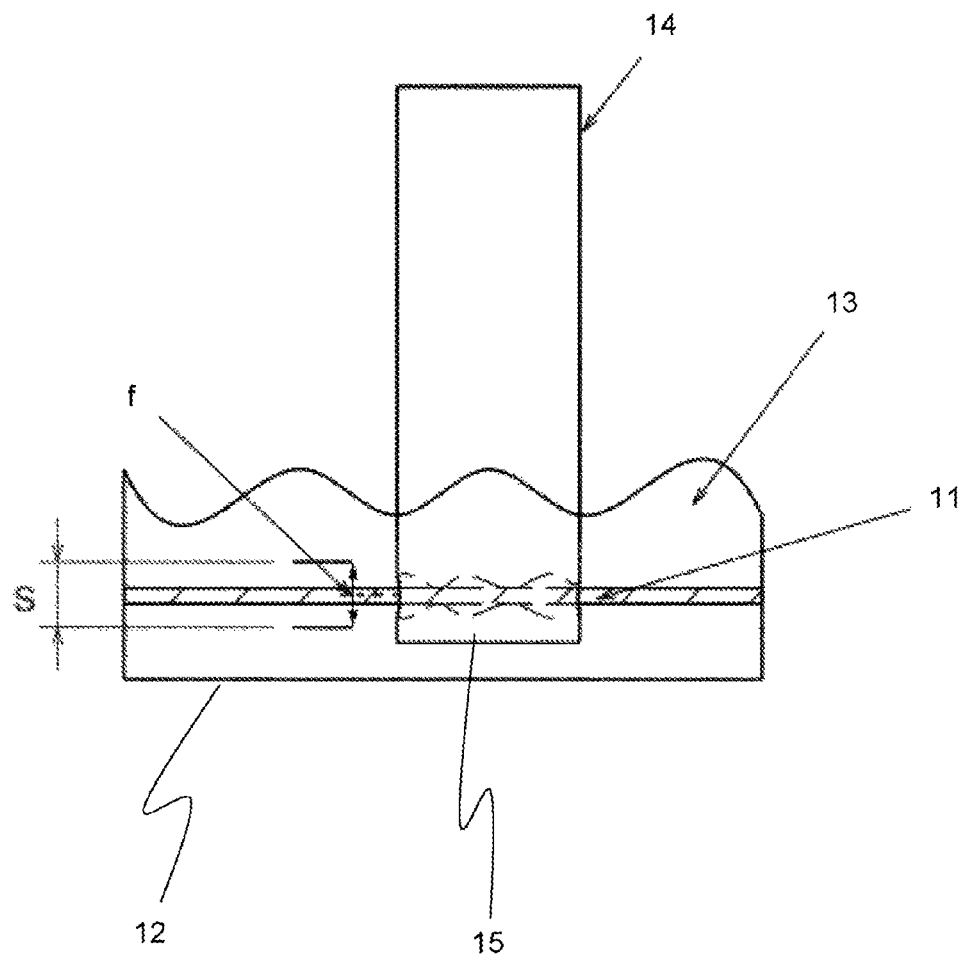
FIG. 2 shows a schematic illustration of the device in a first embodiment.

FIG. 2 schematically shows the device 10, in the case of which the vibration generator 14 has a recess, which partially or completely encloses the fiber bundle guided through the impregnation cavity, specifically in full contact with the highly viscous plastics material, in the region of its surface

15, by way of which the vibration generator is in contact with the highly viscous plastics material. The roving 11 is accordingly guided through a type of "hole" in the longitudinal vibrator which has a particular profile geometry, wherein in the process the fibers of the roving can be in contact with the surface of the longitudinal vibrator 14 at certain points. The particular geometry prevents the material from being closed off or ensures that the vibration energy is coupled in through zones of excess pressure and negative pressure in an improved manner.

Figure 3:
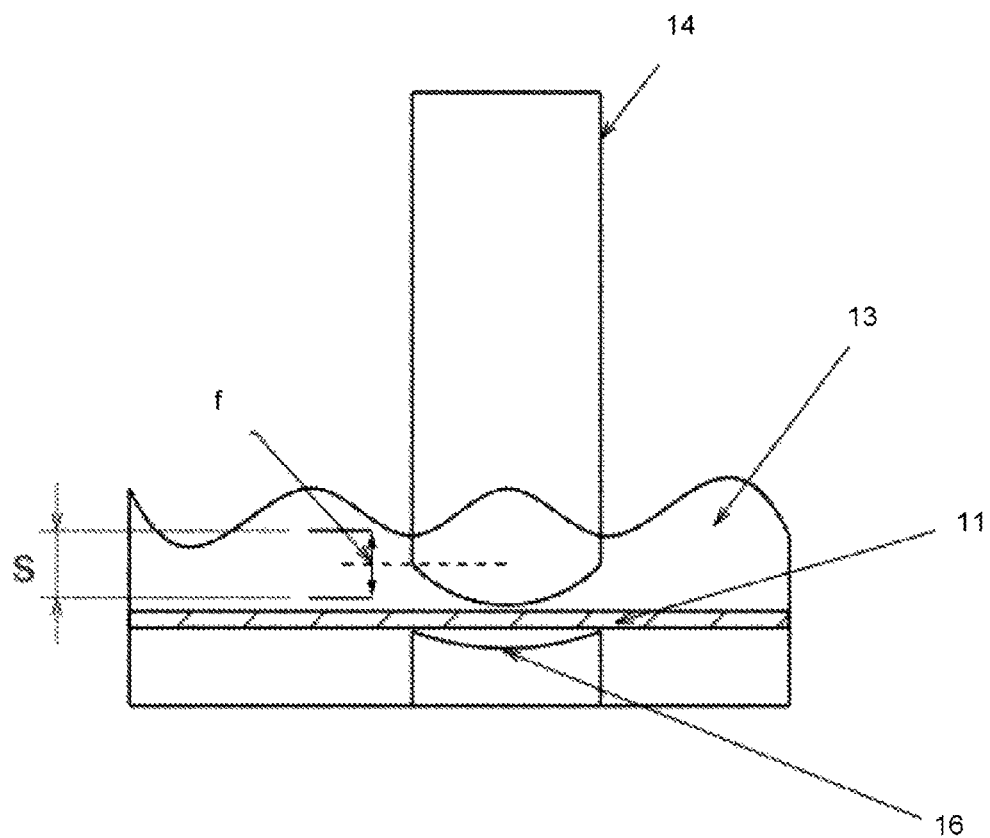
FIG. 3 shows a schematic illustration of the device in a second embodiment.

FIG. 3 schematically shows a further embodiment of the device 10, in the case of which a counterpart or a counterpart element 16 is situated opposite the vibration generator 14 in such a way that the fiber bundle 11 is guided through between the surface 15 of the vibration generator 14 and the counterpart 16.

The counterpart 16 may be for example a reflection element, which is arranged in the impregnation cavity 12 and reflects the sound waves coupled in by the vibration generator 14, as a result of which the influence or the action of the sound waves on the impregnation process can be improved.

It is of course also conceivable that the counterpart 16 is likewise a vibration generator that can actively introduce sound waves into the highly viscous plastics material, wherein the frequency and amplitude of the two vibration generators 14 and 16 can be matched such that the greatest possible effect of impregnating the roving can be achieved.

Figure 4:
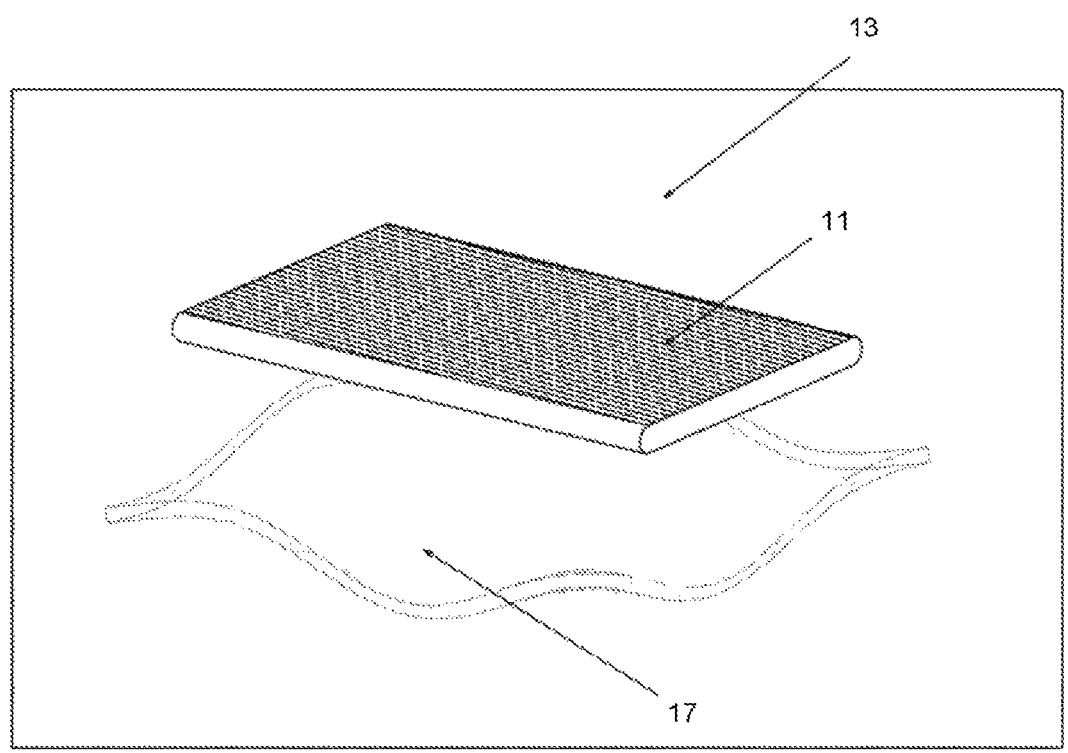
FIG. 4 shows a schematic illustration of the device with a modally vibrating structure.

FIG. 4 shows a highly simplified schematic view of an embodiment, in the case of which a slightly spread-open roving is pulled through a highly viscous plastics material, wherein located in the impregnation cavity 12 is a modally vibrating structure 17 which, in the form of a vibration generator, is intended to introduce corresponding sound energy into the highly viscous plastics material. Here, the vibration maxima and vibration minima that arise couple the vibration energy into the highly viscous plastics material in a spatially distributed manner.

Figure 5:
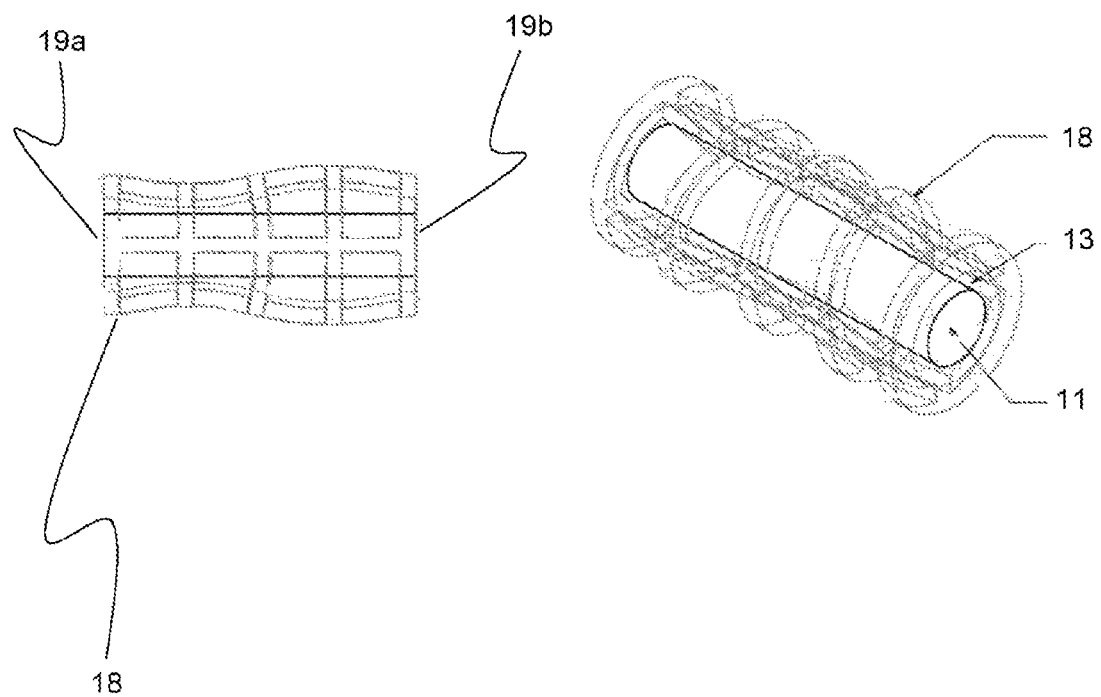
FIG. 5 shows a schematic illustration of the impregnation cavity with eigenmodes.

FIG. 5 shows a further exemplary embodiment of a modally vibrating structure 18 with eigenmodes, which is designed such that it completely encloses the roving 11. In this case, the surface of the vibration generator is formed by the modally vibrating structures 17 and 18, wherein the vibration generator is designed in such a way that real and/or complex eigenmodes of these structures 17 and 18 can be induced. Here, these modally vibrating structures 17 and 18 are located within the impregnation cavity 12 and can preferably be completely enclosed by the highly viscous plastic material 13. This makes it possible to introduce the sound energy required to improve the impregnation performance into the plastics material very effectively. In addition, an embodiment of this type only requires very little structural space and is accordingly suitable especially for generative methods.

However, it is also conceivable that the modally vibrating structure 18 in the form of a tube, shown in FIG. 5, forms the actual impregnation cavity, and therefore the tube 18 is the impregnation cavity. For this purpose, the tube 18 has an inlet 19*a* and an outlet 19*b*, with the result that the fiber material 11 is guided through the inlet 19*a* into the interior of the tube and is guided out again through the outlet 19*b*. Furthermore located inside the tube 18 is the molten plastics material, wherein the sound energy is introduced into the molten plastics material through the tube 18 in the form of a modally vibrating structure with eigenmodes. In this exemplary embodiment, intentionally no plastics material is located outside the tube; said plastics material is present only in the tube, together with the fiber material.

Figure 6:
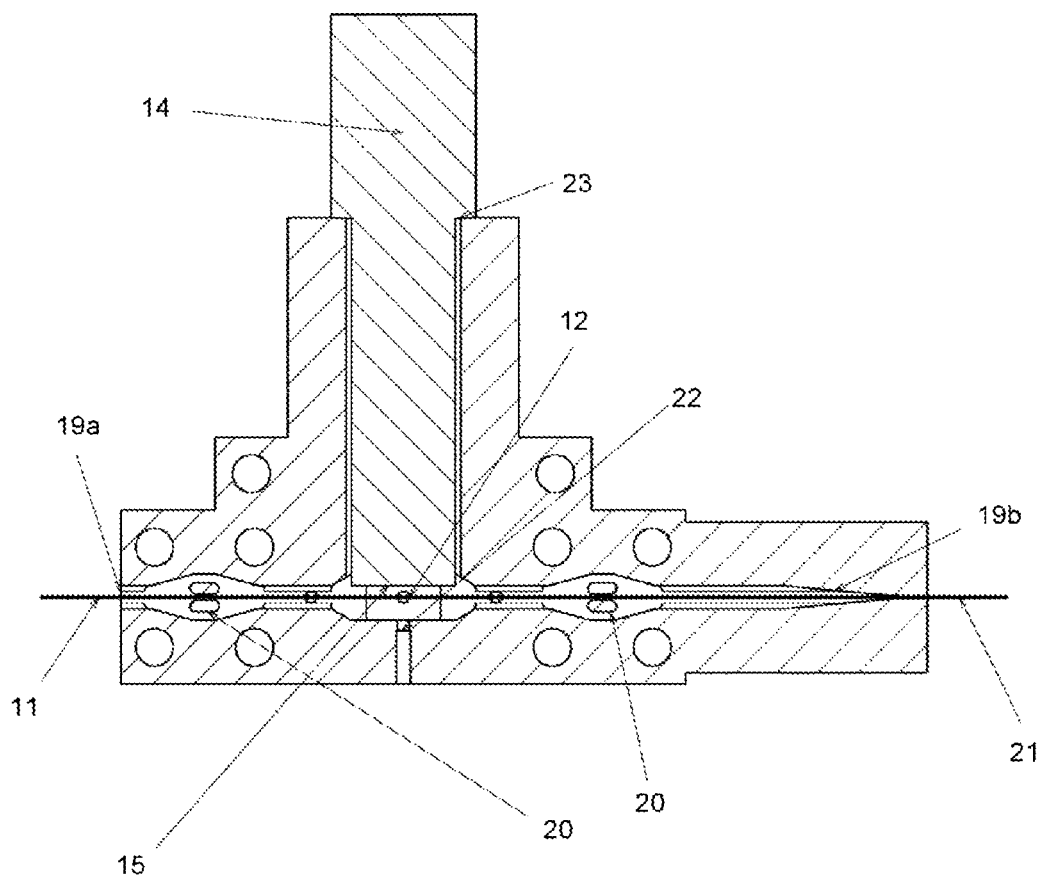
FIG. 6 shows a schematic illustration of an impregnation cavity with an outlet nozzle.

FIG. 6 shows a greatly simplified illustration of the device 10 in a further embodiment. The device 10 has an impregnation cavity 12, through which the fiber bundle 11 and the highly viscous plastics material 13 are guided. Furthermore, the vibration generator 14 in the form of a sonotrode protrudes into the impregnation cavity 12 in such a way that the vibration generator 14 is in contact with the molten plastics material 13 without making contact with the fiber bundle 11 in the impregnation cavity. The vibration generator 14 can thus be used to introduce sound energy into the molten plastics material 13.

Both the fiber bundle 11 (which is not impregnated, not completely impregnated or not sufficiently impregnated) and the molten plastics material 13 are introduced into the device 10 via an inlet 19*a*, with the result that the fiber bundle 11 and the molten plastics material 13 can be introduced into the impregnation cavity 12. The fiber bundle 11 impregnated with the plastics material 13 is then guided out of the device 10 from an outlet 19*b*.

In this respect, the outlet 19*b* is designed in the form of an extruder or a nozzle for shaping and consolidating the plastics material. By shaping the outlet 19*b* in the form of a nozzle or an extruder by contrast with the inlet, a pressure gradient can be created in the plastics material 13 between the inlet 19*a* and the outlet 19*b*. Here, the melt pressure may be between 15 bar and 100 bar, if appropriate 400 bar.

In this respect, the inlet 19*a* is designed for the pressure-tight feed of the fiber bundle 11 and the molten plastics material 13. The outlet 19*b* may be designed here to be pressure-tight, in particular with respect to the molten plastics material.

In this respect, the vibration generator 14 is likewise arranged on the device 10 in a pressure-tight manner with respect to the impregnation cavity 12.

Imprinting the molten plastics material 13 with a pressure or forming a pressure gradient can have the effect, in conjunction with the introduction of the sound energy by the vibration generator 14, that cavitations form and disperse in the molten plastics material 13, which cavitations result in a significant improvement in the impregnation result. It has been found that the microjets and/or shock waves (cavitation effects) which are produced when the cavitations disperse result in an improvement in the impregnation, in particular when using highly viscous plastics materials.

Guide elements 20 are located between the inlet 19*a* and upstream of the outlet 19*b* in order to guide the fiber material 11 at the correct position through the impregnation cavity 12. In this case, the sonotrode 14 or the vibration generator is arranged between the guide elements 20.

Here, the vibration generator 14 is connected to the device 10 via a pressure-tight attachment 23. The temperature and the pressure can be continuously monitored via a sensor 22 in the region of the impregnation cavity 12.

Finally, the impregnated fiber roving 21 is guided out at the outlet 19*b*.

LIST OF REFERENCE SIGNS

10 Device
11 Fiber bundle/roving
12 Impregnation cavity
13 Highly viscous plastics material
14 Vibration generator
15 Surface of the vibration generator
16 Counterpart/counterpart element 17 Modally vibrating plate structure
18 Modally vibrating tube with eigenmodes
19a Inlet
19b Outlet
20 Guide elements
21 Impregnated fiber roving
22 Sensor
23 Pressure-tight attachment

The invention claimed is:

1. A method for impregnating at least one fiber bundle with a highly viscous plastics, comprising:
providing at least one fiber bundle to be impregnated, wherein the at least one fiber bundle is formed from a multiplicity of endless fibers, and providing a plastics material that attains a molten, highly viscous state at a predefined process temperature, and
impregnating the at least one fiber bundle with the plastics material by continuously guiding the at least one fiber bundle to be impregnated through an impregnation cavity which is filled with the plastics material in the molten, and highly viscous state at the predefined process temperature,
wherein, during the impregnation of the at least one fiber bundle, the plastics material located in the impregnation cavity is in contact with a surface of at least one vibration generator such that sound energy is introduced into the plastics material while the plastics material is in the molten, highly viscous state,
wherein a surface of the impregnation cavity is a surface of a structure having a natural vibration characteristic having real and/or complex eigenmodes, and
wherein the vibration generator is configured to induce the real and/or complex eigenmodes of the structure during the impregnation of the at least one fiber bundle, while the plastics material located in the impregnation cavity is in contact with the surface of the structure having the natural vibration characteristic having real and/or complex eigenmodes.

2. The method as claimed in claim 1, wherein the plastics material is a thermoplastic material.

3. The method as claimed in claim 1 wherein the vibration generator generates a vibration amplitude of between 1 μm and 150 μm, and/or wherein the vibration generator generates a vibration frequency of between 100 Hz and 100 kHz.

4. The method as claimed in claim 1 wherein the surface of the vibration generator in contact with the plastics material is subjected to a microstructuring, roughening and/or plasma pretreatment or is provided such that adhesion and/or wetting of the surface of the vibration generator with the plastics material is better than if no treatment of the surface is provided.

5. The method as claimed in claim 1 wherein the plastics material is physically modified in a manner that reduces forces of cohesion.

6. The method as claimed in claim 1,
wherein the vibration generator includes a vibrator,
wherein the vibrator is configured with a hole or recess having a surface,
at least one fiber bundle in the impregnation cavity is guided through the surface of the vibrator in a manner wherein the surface of the vibrator at least partially encloses the at least one fiber bundle while the surface of the vibration generator is in contact with the plastics material while it is in the molten and highly viscous state.

7. The method as claimed in claim 1 wherein the plastics material is guided or flows through the impregnation cavity together with the at least one fiber bundle.

8. The method as claimed in claim 1 further comprising applying a pressure to the plastics material in the impregnation cavity during the impregnation of the at least one fiber bundle.

9. A method for producing a three-dimensional structure which is formed from two or more different materials by a three-dimensional (3D) printhead of a 3D printing installation, comprising:
feeding a plastics material in a molten and highly viscous state as a first material and a virtually endless fiber bundle of a fiber material as a second material to the 3D printing installation,
wherein the first material and the second material are continuously fed to an impregnation cavity of the 3D printing installation in order to impregnate the virtually endless fiber bundle with the plastics material,
extruding the fiber bundle impregnated with the plastics material from a 3D printhead of the 3D printing installation,
wherein, during the production of the three-dimensional structure, the virtually endless fiber bundle is continuously impregnated with the plastics material by the method as claimed in claim 1.

* * * * *